Patented Dec. 14, 1948

2,456,555

UNITED STATES PATENT OFFICE 2,456,555

SECONDARY ALKYL (SECONDARY) AMINO ALCOHOL ESTERS OF ARYL-SUBSTITUTED ALIPHATIC ACIDS

Arthur C. Cope, Belmont, Mass., assignor to Sharp & Dohme, Incorporated, Philadelphia, Pa., a corporation of Maryland No Drawing. Application October 6, 1945, Serial No. 620,839

12 Claims. (Cl. 260—477)

This invention relates to cinnamic, diphenylacetic, alpha-cyclohexyl - alpha - phenyl-acetic, and alpha-phenylbutyric acid esters of secondary-alkyl(secondary)-amino - ethanols, -propanols and -butanols, which esters are useful as local anesthetics and antispasmodics, in general, combining high effectiveness with relatively low toxicity.

The compounds of the invention are represented by the general formula X—COOR₁NHR, in which R represents a secondary alkyl group attached to the amino nitrogen, R₁ represents the alkylene group having at least two, three or four carbon atoms or, in other words, the divalent aliphatic residue of the ethanol, propanol or butanol, X is selected from the styryl radical, the diphenylmethyl radical, the alphacyclohexyl-alpha-phenyl-methyl, and the alphaphenylpropyl radical.

Thus, it is seen that both the alkyl substituent on the amino group and the amino group itself are secondary, and that the secondary amino group is derived from ammonia by replacing one of its hydrogens by the secondary-alkyl substituent and a second hydrogen by the alkylene group represented by R₁. Accordingly, in this specification and in the claims the expression "secondary-alkyl(secondary)-amino" is used to describe the alkyl-amino grouping on the ethanol-, propanol- and butanol-amine portion of the compounds of the invention and to show that the amino group is always secondary and that the alkyl substituent on the amino group is always secondary.

The secondary-alkyl substituent on the amino group of the alkylaminoalkanol portion of the compounds of the invention contains at least three carbon atoms and may be open chain as isopropyl, secondary-butyl, -pentyl, -hexyl, -heptyl, -octyl, -nonyl, and the like, or cyclic as the alicyclic groups such as cyclopentyl, cyclohexyl and the like, and the various open chain or cyclic groupings may be unsubstituted as those already mentioned or mono- or poly-substituted as with other alkyl groups such as in groups like 4-methylpentyl, 2,6-dimethylheptyl (or diisobutylmethyl), and the like as well as 3-ethylcyclopentyl, 4-methylcyclohexyl, 4-ethylcyclohexyl and the like.

The esters of the invention are prepared by suitable reaction between the acidyl anhydride or halide such as the acid chloride or bromide of cinnamic acid, diphenylacetic acid or alphaphenylbutyric acid (as the cinnamoyl halide, diphenylacetyl halide or alpha-phenylbutyryl halide) with the desired secondary-alkyl-aminoethanol, -propanol or -butanol. In preparing the esters starting with an alkylaminoalkanol containing a non-tertiary alcohol group, the acidyl halide or anhydride of the particular acids disclosed is reacted with an addition salt of the desired alkylaminoalkanol containing the desired secondary-alkyl substituent on its amino group. An advantageous procedure for condensing the acidyl compound with the salt of the aminoalkanol is to dissolve the aminoalkanol in an inert solvent such as a chlorinated lower paraffin hydrocarbon as chloroform or methylene chloride and the like and to convert it to its addition salt such as the hydrochloride by saturating the solution with dry hydrochloric acid gas, with cooling, and then to add to the solution an equal molal quantity of the respective acidyl halide as cinnamoyl chloride dissolved in an equal quantity of the same solvent, and heating the reaction mixture under reflux at 50 to 60° C., or higher, but preferably at the lower temperature range, then cooling the reaction mixture and removing the solvent under vacuum, and if the free base is desired, then treating the reaction product suspended in water with sufficient suitable alkali as sodium carbonate monohydrate to liberate the free amino ester.

The invention may be illustrated by, but not restricted to, the following examples:

*Example 1.—2-isopropylamino-ethyl alpha-phenylbutyrate hydrochloride.*—A solution of 0.1 mol of 2-isopropylamino-ethanol in 30 grams of chloroform was saturated with dry hydrogen chloride gas, with cooling. A solution of 0.1 mol alpha-phenylbutyryl chloride in 30 grams of chloroform was added and the solution was heated in a bath at 50–60° C. for four days under a reflux condenser protected from atmospheric moisture. Then the solvent was removed by vacuum distillation while the mixture was warmed on a water bath. Benzene was then added to the syrupy residue and the reaction product crystallized out after the benzene was removed by vacuum distillation. The crystallized solid residue was washed with anhydrous ether to remove any unreacted alpha-phenylbutyryl chloride. The 2-isopropylamino-ethyl alpha-phenylbutyrate hydrochloride obtained was purified by recrystallization from alcohol and ether. It melted at 123–125° C.

By replacing the 2-isopropylamino-ethanol in the above example separately by 2-(4-heptylamino)-ethanol, 2-[4-(2,6-dimethylheptyl)amino]-ethanol, 2-cyclohexylamino-ethanol, there is obtained the corresponding hydrochloride of the alpha-phenylbutyric acid ester: 2-(4-heptylamino)-ethyl alpha-phenylbutyrate hydrochloride, M. P. 84–85° C., 2-[4-(2,6-dimethylheptyl)-amino]-ethyl alpha-phenylbutyrate hydrochloride, M. P. 118–120° C., 2-cyclohexylamino-ethyl alpha-phenylbutyrate hydrochloride, M. P. 119–120° C. Similarly by replacing 2-isopropylamino-ethanol of Example 1 by any (secondary) alkylamino-ethanol, -propanol or -butanol, such as 1-alkylamino-2-propanols, 2-alkylamino-1-propanols, 3-alkylamino-1-propanols, 2-alkylamino-2-methyl-1-propanols, and the like, the (secondary-alkyl group of any of which may be, for example, isopropyl, 3-pentyl, 4-heptyl, 4-(2,6-dimethylheptyl), cyclohexyl, and the like, or as, for example a 2-alkylamino-1-butanol of any of the above exemplified alkyl groups there are obtained the corresponding alpha-phenylbutyrate hydrochlorides of 1-alkylamino-2-propanols, alpha-phenylbutyrate hydrochlorides of 2-alkylamino-1-propanols, alpha-phenylbutyrate hydrochlorides of 3-alkylamino-1-propanols, alpha-phenylbutyrate hydrochlorides of 2-alkylamino-2-methyl-1-propanols, alpha-phenylbutyrate hydrochlorides of 2-alkylamino-1-butanols, and the like.

*Example 2.—1-(3-pentylamino)-2-propyl diphenylacetate hydrochloride* melting at 141–142° C. was obtained by replacing the alkylaminoalkanol and the alphaphenylbutyryl chloride of Example 1 by the molal equivalent respectively of 1-(3-pentylamino)-2-propanol and diphenylacetyl chloride.

By replacing the alkylaminoalkanol of Example 2 by the molal equivalent of any (secondary) alkylamino-ethanol, -propanol or -butanol, any of each of which is primary or secondary, there is obtained the corresponding diphenylacetate hydrochlorides, such as, for example, 2-(sec. butyl) amino-ethyl diphenylacetate hydrochloride, M. P. 154–156° C., 2-(2-pentylamino)-ethyl diphenylacetate hydrochloride, M. P. 121–123° C., 2-(3-pentylamino)-ethyl diphenylacetate hydrochloride, M. P. 152.5–153.5° C., 2-[4-(2,6-dimethylheptyl)amino]-ethyl diphenylacetate hydrochloride, M. P. 119–121° C., 2-cyclohexylamino-ethyl diphenylacetate hydrochloride, M. P. 176–177° C., 1-isopropylamino-2-propyl diphenylacetate hydrochloride, M. P. 184–185° C., 1-(4-heptylamino)-2-propyl diphenylacetate hydrochloride, M. P. 119–120° C., 1-[4-(2,6 - dimethylheptyl)amino]-2-propyl diphenylacetate hydrochloride, M. P. 167–169° C., 1-cyclohexylamino-2-propyl diphenylacetate hydrochloride, M. P. 183–184° C., 2-cyclohexylamino-1-butyl diphenylacetate hydrochloride, M. P. 127–128° C., 2-(3-pentylamino)-1-butyl diphenylacetate hydrochloride, M. P. 120.5–122° C. and the like.

Similarly, by replacing the alpha-phenylbutyryl chloride of Example 1 or the diphenylacetyl chloride of Example 2, or in any of the modifications noted in connection with either one of these two examples, by the molal equivalent of cinnamoyl chloride, there is obtained respectively the secondary alkyl (secondary)amino alkyl cinnamate hydrochloride.

In preparing the esters starting with an alkylaminoalkanol containing a tertiary alcohol group, the desired secondary-alkylaminoalkanol having the tertiary alcohol group and containing the desired secondary-alkyl substituent on its amino group is reacted with a substantial excess such as a 50% excess of the acidyl halide or anhydride of cinnamic, diphenylacetic, alpha-cyclohexyl-alpha-phenyl-acetic or alpha-phenylbutyric acids to form the corresponding N-acyl derivative of the selected alkylamino-alkanol, which amide is then rearranged to the corresponding ester hydrochloride, for example, by boiling in absolute alcohol with an excess of concentrated hydrochloric acid. Such procedure may be illustrated by, but not restricted to, the following examples:

*Example 3.—1 - cyclohexylamino-2-methyl-2-propyl cinnamate hydrochloride.*—(a) A 50% excess of cinnamoyl chloride in 100 cc. methylene chloride was added rapidly to a vigorously stirred suspension of 0.035 to 0.065 mole of 1-cyclohexylamino-2-methyl-2-propanol in about 200 cc. of 5% aqueous sodium hydroxide. The mixture was heated, with vigorous mechanical stirring, in a water bath so that the methylene chloride refluxed at 40–45° C. for one hour, after which the reaction mixture layers were separated and the aqueous layer was then extracted with methylene chloride. The combined methylene chloride solutions were washed twice with water and concentrated under vacuum to a syrupy liquid of constant weight, representing a 76% yield of the N-cinnamoyl derivative of 1-cyclohexylamino-2-methyl-2-propanol.

(b) 0.017 mole of this product was rearranged to the corresponding ester hydrochloride by boiling with a 50% excess of concentrated hydrochloric acid in an alcohol solution for five minutes. The solution was cooled and then vacuum distilled to dryness. The residue was dried by adding benzene and reconcentrating under vacuum. The thus dried product was recrystallized from acetone in a 64% yield, M. P. 161–163° C.

*Example 4.—1-cyclohexylamino-2-methyl-2-propyl diphenylacetate hydrochloride.*—The N-acyl derivative was obtained by the procedure of Example 3(a) by replacing the cinnamoyl chloride by the diphenylacetylchloride. The amide was obtained in 84% yield with M. P. of 154–155.5° C. after recrystallization from alcohol. 3.7 grams of the thus formed N-acyl derivative was refluxed for one hour in 25 cc. absolute alcohol containing 0.9 cc. of concentrated hydrochloric acid, cooled and filtered to remove any unchanged amide. A 60% yield of 1-cyclohexylamino-2-methyl-2-propyl diphenylacetate hydrochloride was obtained from the filtrate by distilling to dryness under vacuum and recrystallizing the residue from acetone. It melted at 172–174° C.

*Example 5.—1 - cyclohexylamino-2-methyl-2-propyl alpha - phenylbutyrate hydrochloride.*— The N-acyl derivative was obtained by the procedure of Example 3(a) by replacing the cinnamoyl chloride by alpha-phenylbutyryl chloride. A 79% yield of the amide was obtained with M. P. 66.5–68° C. after recrystallization from ether and pentane. The ester is prepared by any of the above described methods of rearrangement.

*Example 6.—1-cyclohexylamino-2-methyl-2-propyl-carbanilate hydrochloride.*—The N-acyl derivative was prepared by a procedure similar to Example 3(a) by adding 4.8 grams of phenyl isocyanate slowly to a solution of 6.8 grams of the aminoalcohol in methylene chloride. An 83% yield of the amide was obtained, showing a M. P. 131.5–132.5° C. after recrystallization from benzene. 4.4 grams of this amide was dissolved in 75 cc. of chloroform and the solution saturated with dry hydrogen chloride. The solution was then heated in a bath maintained at 55° C. for seventy hours. The solution was then vacuum evaporated to dryness and the residue recrystallized from alcohol and ether yielding 41% of the ester, M. P. 196–197° C. (with decomposition).

Also included are the cinnamates, diphenylacetates, alpha-cyclohexyl-alpha-phenyl-acetates and alpha-phenylbutyrates obtained with other secondary-alkyl-aminoalkanols having a tertiary alcohol group, according to the procedure of Examples 3 through 5, such as:

1-cyclopentylamino-2-methyl-2-propyl cinnamate
1-isopropylamino-2-methyl-2-propyl cinnamate
1-(3-pentylamino)-2-methyl-2-propyl cinnamate
1-(2-heptylamino)-2-methyl-2-propyl cinnamate
1-(2-octylamino)-2-methyl-2-propyl cinnamate
1-isopropylamino-2-methyl-2-butyl cinnamate
1-isopropylamino-2-ethyl-2-butyl cinnamate or the corresponding diphenyl-acetates or alpha-phenylbutyrates or alpha-cyclohexyl-alpha-phenyl-acetates.

*Example 7.—2-(2-pentylamino)-ethyl alpha-cyclohexyl-alpha-phenyl-acetate hydrochloride.*—A solution of 7.1 g. (0.03 mole) of alpha-cyclohexylphenylacetyl chloride in 10 g. of chloroform was added to a solution of 3.9 g. (0.03 mole) of 2-(2-pentylamino)-ethanol in 10 g. of chloroform saturated with dry hydrogen chloride. The resulting solution was heated at 50° for forty-one hours. The solvent was removed under vacuum, and the residue crystallized slowly after stirring with pentane and cooling. The yield of the product crystallized from acetone and ether was 2.0 g. (25%), M. P. 109–111° C.

Similarly, by replacing the secondary alkyl-(secondary) amino alkanol of Example 7 by any other secondary alkyl(secondary) amino alkanol described hereinabove there is obtained the corresponding alpha-cyclohexyl-alpha-phenyl-acetate hydrochloride of the selected secondary alkyl(secondary) amino alkanol.

The esters of the invention are thus prepared from a wide variety of secondary-alkyl(secondary) amino-alkanols selected from the -ethanols, -propanols and -butanols, which alkanols then include a wide variety of such as the 2-secondary-alkyl-(secondary) amino-1-alkanols, and 3-secondary-alkyl(secondary) amino-1-alkanols, and also 1-secondary-alkyl(secondary) amino-2-alkanols, in all of which the alkanol group is selected from the ethanol, propanol and butanol groups, which alkanol groups may contain the secondary-alkylamino grouping as the sole substituent or may contain additional substituents on the alkanol carbons, such as an alkyl radical, preferably a lower radical, on the 2- and 3- carbon atoms.

The various suitable secondary-alkyl(secondary) amino-ethanols, -propanols and -butanols advantageously may be prepared by condensing a ketone with a primary amino alcohol, with simultaneous or subsequent reduction, the mechanism of which is the formation of an intermediate alkylidene amino alcohol, or the formation of an intermediate oxazolidine or the formation of an intermediate mixture of both. Such advantageous procedure is described in my copending application Serial No. 489,499, filed June 3, 1943, now abandoned, reference to which is made for details of such procedure.

While the various Examples 1 through 7 show the preparation of the hydrochloride of the various esters, if the free base is desired instead, it is prepared by dissolving or suspending the hydrochloride in a small volume of alcohol, diluting with water and treating with an excess over the stoichiometric quantity of sodium carbonate. The liberated free base is extracted with benzene and recovered therefrom in known manner. If a salt of an acid other than hydrochloric acid is desired, then to a solution of the free base, for example, in benzene, there is added the stoichiometric quantity of the particular acid of which the addition salt is desired, and the solvent removed by evaporation, under vacuum if desired, and the desired addition salt obtained by crystallization.

The anesthetic compounds of the invention are the free amines, that is, the free bases. Ordinarily they are used in the form of addition salts, for example, as a hydrochloride, sulfate, sulfamate, tartrate, glycolate or other addition salt, as the free amines or bases are quite insoluble in water. The selected salt should have sufficient solubility in water to be completely soluble in the concentrations used, usually of the order of 1% or less. The hydrochlorides and the glycolates are among those particularly therapeutically effective. The esters in which the secondary-alkyl substituent on the amino group contains less than 11 carbon atoms are particularly effective.

While these various individual illustrations of the esters of the invention have been separately named as a certain ethyl, propyl or as a certain butyl acid ester, as exemplified in starting with 2-isopropylamino-ethyl alpha-phenylbutyrate as in Example 1 and continuing from there through the disclosure ending with 2-(2-pentylamino)-ethyl alpha-cyclohexyl-alpha-phenyl-acetate, insofar as nomenclature is concerned each of the various individual esters embraced in the invention is either an ester of a secondary-alkyl(secondary) amino-ethanol, secondary-alkyl(secondary) amino-propanol or of a secondary-alkyl(secondary) amino-butanol.

What is claimed is:

1. Esters of secondary alkyl(secondary) amino alcohols, of the general formula X—COOR₁NHR, in which R represents a secondary alkyl group attached to the amino nitrogen and has a total of at least three and less than eleven carbon atoms, R₁ is a divalent alkylene group having a total of from two through four carbon atoms and with at least two carbon atoms linked in sequence between the oxygen and the nitrogen, and X is selected from the group consisting of the styryl radical, diphenylmethyl radical, alpha-cyclohexyl-alpha-phenylmethyl radical and alpha-phenylpropyl radical.

2. Esters of secondary alkyl(secondary) amino alcohols, as in claim 1, in which X is the styryl radical.

3. Esters of secondary alkyl(secondary) amino alcohols, as in claim 1, in which X is the diphenyl methyl radical.

4. Esters of secondary alkyl(secondary) amino alcohols, as in claim 1, in which X is the alpha-phenylpropyl radical.

5. Esters of secondary alkyl(secondary) amino alcohols, of the general formula

$C_6H_5$—$R_2$—COO—$R_1$—NHR in which R represents a secondary alkyl group attached to the amino nitrogen and has a total of at least three and less than eleven carbon atoms, R₁ is a divalent alkylene group having a total of from two through four carbon atoms with at least two carbon atoms linked in sequence between the oxygen and the nitrogen, and R₂ is a divalent aliphatic hydrocarbon radical selected from the vinylene and propylidene radicals.

6. Esters of secondary alkyl(secondary)amino alcohols, of the general formula X—COOR₁NHR in which R is an alicyclic radical having less than eleven carbon atoms and having at least five and less than seven carbon atoms linked together in sequence to form the alicyclic ring, R₁ is a divalent alkylene group having a total of from two through four carbon atoms and with at least two carbon atoms linked in sequence between the oxygen and the nitrogen, and X is selected from the group consisting of the styryl radical, diphenylmethyl radical, alpha-cyclohexyl-alpha-phenylmethyl radical and alpha-phenylpropyl radical.

7. Esters of secondary alkyl(secondary)amino alcohols, as claimed in claim 6, in which X is the styryl radical.

8. Esters of secondary alkyl(secondary)amino alcohols, as claimed in claim 6, in which X is the diphenylmethyl radical.

9. Esters of secondary alkyl(secondary)amino alcohols, as claimed in claim 6, in which X is the alpha-phenylpropyl radical.

10. 2-(2-pentylamino)-ethyl diphenylacetate hydrochloride.

11. 1-cyclohexylamino-2-propyl diphenylacetate hydrochloride.

12. 2-cyclohexylamino-ethyl alpha-phenyl-butyrate hydrochloride.

ARTHUR C. COPE.

REFERENCES CITED

The following references are of record in the file of this patent:

UNITED STATES PATENTS

| Number | Name | Date |
|---|---|---|
| 1,817,640 | Brill | Aug. 4, 1931 |
| 2,219,796 | Viaud | Oct. 29, 1940 |
| 2,265,184 | Miescher et al. | Dec. 9, 1941 |
| 2,339,914 | Cope | Jan. 25, 1944 |
| 2,399,506 | Pierce | Apr. 30, 1946 |

OTHER REFERENCES

Pierce et al., "Jour: Amer. Chem. Soc.," vol. 67 (1943), pages 408–409.